May 17, 1938.  A. J. SMITH ET AL  2,117,372
DISTRIBUTION DEVICE
Filed July 2, 1936  4 Sheets-Sheet 4
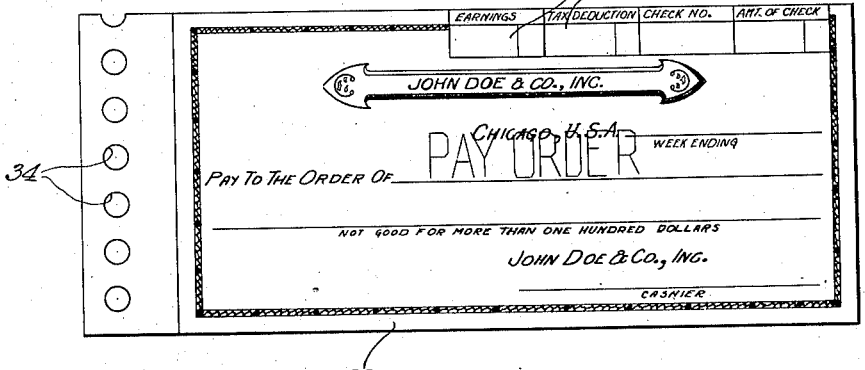

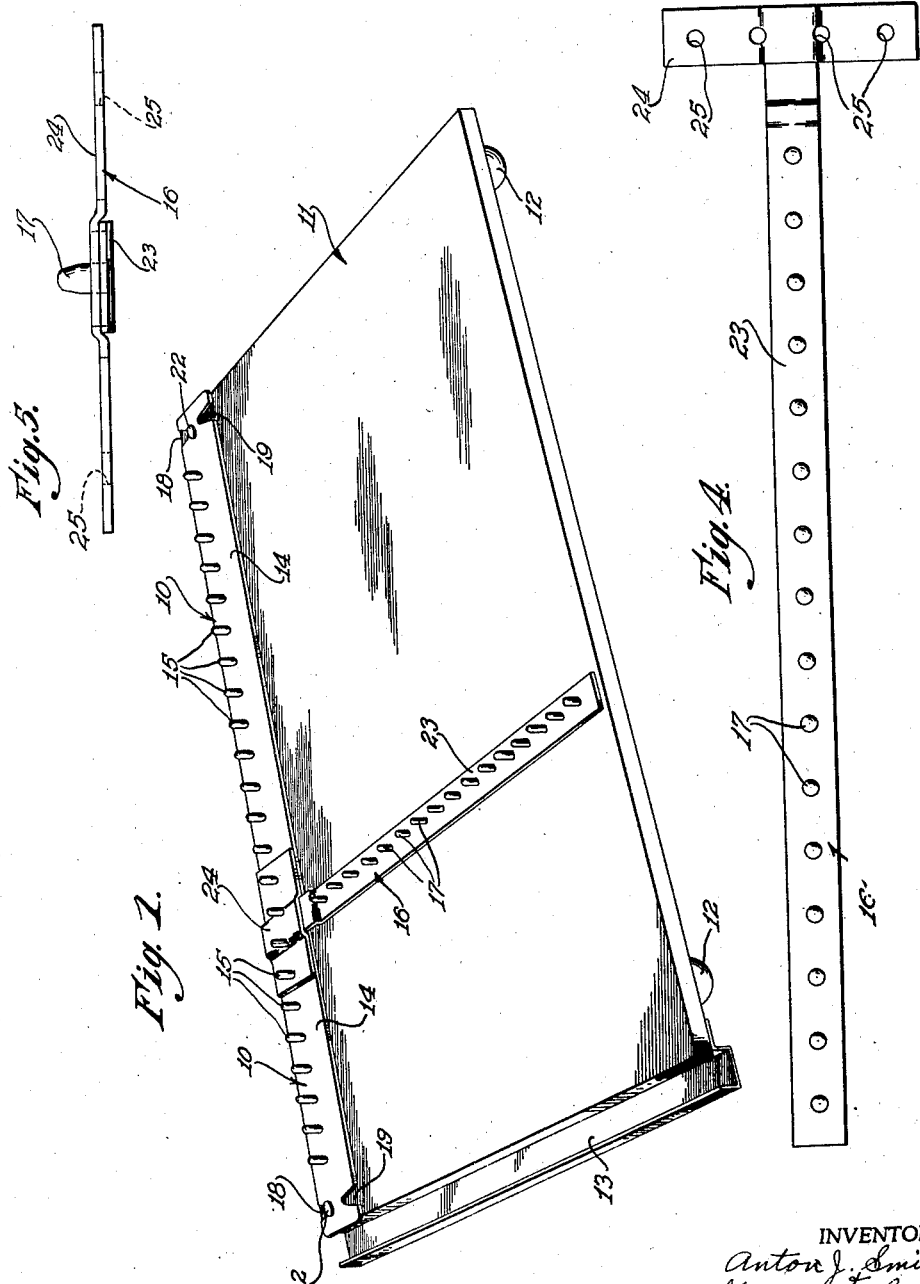

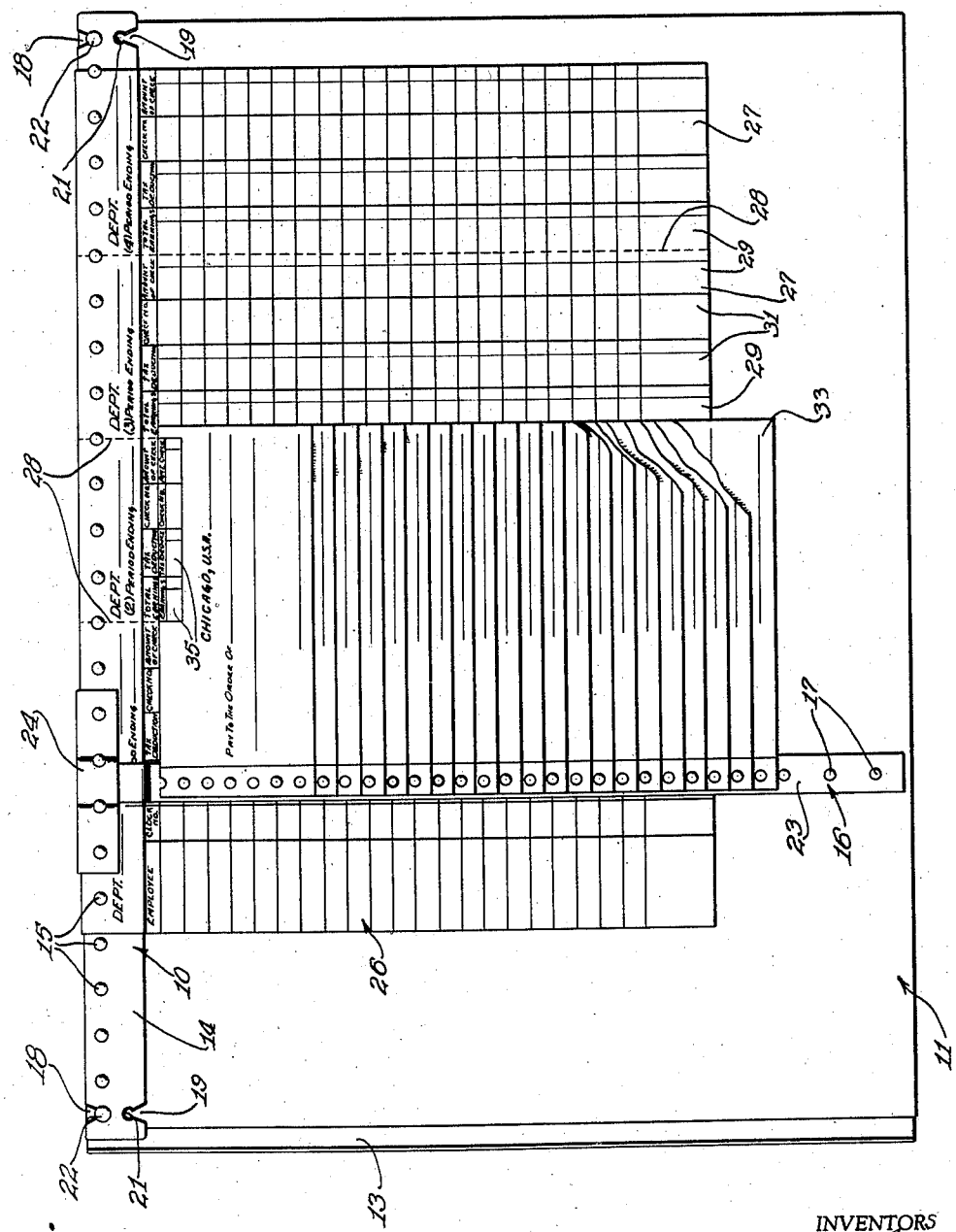

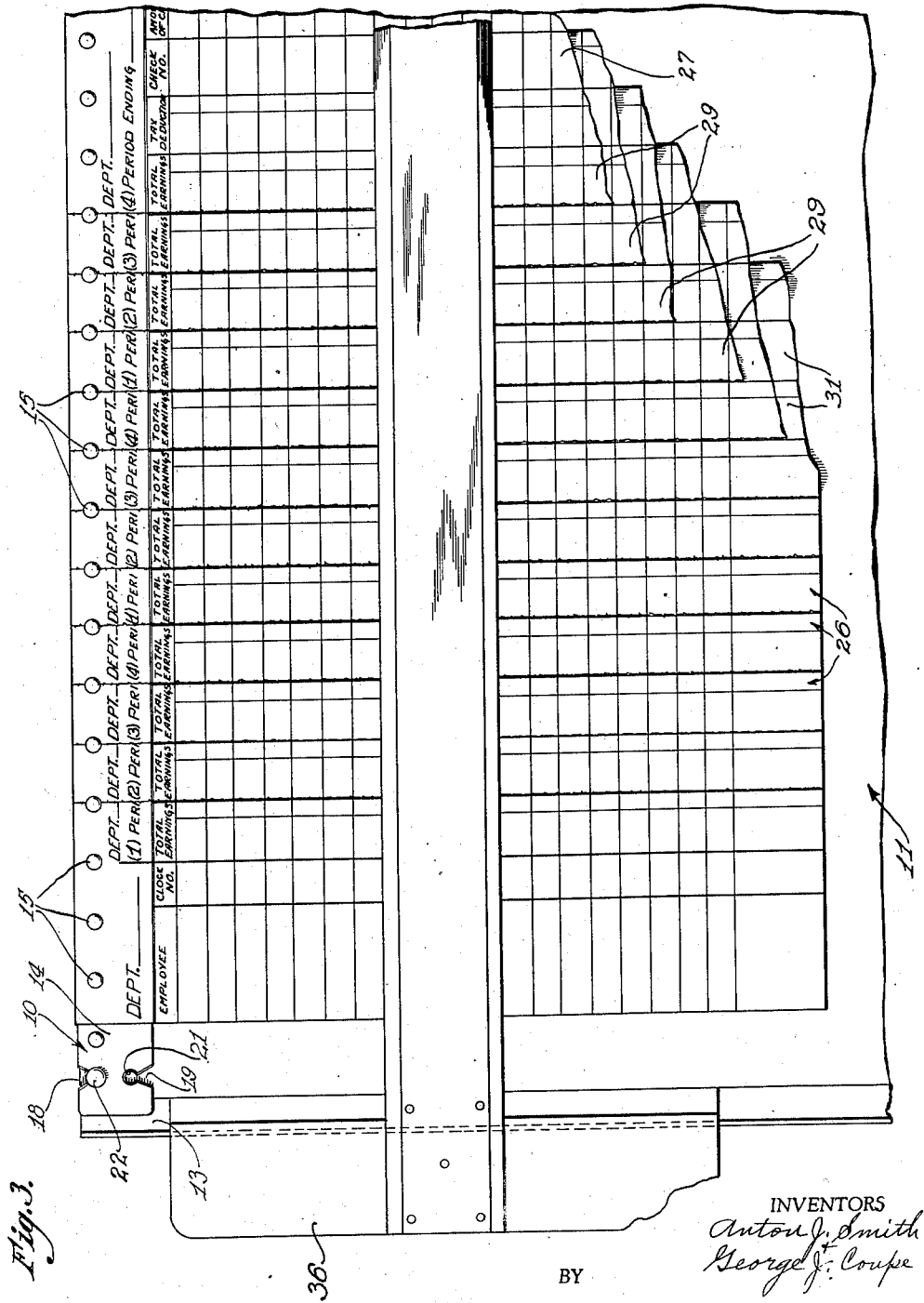

Patented May 17, 1938

2,117,372

UNITED STATES PATENT OFFICE 2,117,372

DISTRIBUTION DEVICE

Anton J. Smith and George J. Coupe, Chicago, Ill., assignors to Felt & Tarrant Mfg. Co., Chicago, Ill., a corporation of Illinois Application July 2, 1936, Serial No. 88,535

9 Claims. (Cl. 282—29)

This invention relates in general to a distribution device, and more particularly to such a device for facilitating the recording of data periodically upon record sheets that are so arranged as to receive said data, as in the process of making out payroll checks, at the same time that said data are inscribed upon the checks.

A principal object of the invention is the provision of a distribution device which enables the simultaneous recording of data upon individual vouchers and a record sheet in any one of a plurality of different locations on said record sheet.

Another important object of the invention is the provision of such a device which is adapted to retain a plurality of strips, obtained by severing the record sheet subsequent to the distribution of the data thereon, in such relative relationship as to facilitate totalizing and crossadding of said data.

An important object of the invention is the provision of a device whereby it is possible to duplicate on a record sheet the required data that may be desired simultaneously with the writing of the various items upon a blank check, or other voucher, so as to be able to more easily compute total earnings or the like.

Another important object of the invention is the provision of a device whereby in its application to a distribution board the data that is accumulated upon a record sheet may be easily totaled for any period of time or groups of periods of time.

Another important object of the invention is the provision of a device that is adapted for use in the distribution of data upon a record sheet from requisitions or other vouchers where it is desirable to keep the originals filed upon a board and allow room for other sheets to be placed upon it in a shingled relationship.

Numerous other objects and advantages of the invention will be apparent as it is better understood from the following description, which, when taken in connection with the accompanying drawings, discloses a preferred embodiment thereof.

In the drawings:

Figure 1 is a perspective view of a record sheet holder embodying the present invention, showing a T-square shaped voucher retaining device positioned thereon;

Fig. 2 is a top plan view of the same showing the sheets and sheet holding means in position;

Fig. 3 is a partial plan view of the same showing its use with a multiplicity of record sheets in the totaling of entries made thereon;

Fig. 4 is a top plan view of the T-square shaped retaining member used in conjunction with the record sheet holder of invention;

Fig. 5 is an end elevational view of the T-square shaped member looking from right to left in Fig. 4;

Fig. 6 is a top plan view of one form of record sheet that may be used in the invention; and Fig. 7 is a top plan view of one form of voucher or check that may be used.

Referring more particularly to the drawings, reference numeral 11 indicates generally a backing support which is substantially rectangular in shape and has fastened to the under side small protuberances 12 that act as leg supports therefor. Attached to one side of the support is a U-shaped channel member 13 which acts as a guide for a T-square, the use of which will be more fully described hereinafter.

A strip or sheet holding means, generally indicated by reference numeral 10 is reversibly attachable to the backing support 11, and comprises a plate 14 having fastened to it in any suitable manner a number of pegs or dowel pins 15. Adapted to be positioned upon the backing support 11 and held in place by the pegs 15 is another metal strip 16 shaped in the form of a T-square and having fastened to it a number of dowel pins, pegs or the like 17.

The ends of the plate 14 extend beyond the outer marginal edges of the backing support 11 and it is provided adjacent each end with a pair of keyhole slots or notches 18, 19 extending in from opposite sides of the plate 14. The round portion of each slot is beveled as indicated at 21. These keyhole slots 18, 19 secure the plate 14 to the packing support 11. The holding members or grip pins 22 are of the usual type comprising a post arranged through the upper corners of the backing support 11, and are provided with an enlarged head portion. The pins 22 are maintained under tension by means of a washer and spring (not shown) on the under side of the backing support 11. It will be apparent that the spring has a tendency to yieldingly urge the head of the pin 22 against the plate 14 to securely latch the latter in position.

To facilitate attachment, the lower part of the head of the grip pin 22 is beveled to correspond with the beveled portion 21 of the plate 14, which is latched by sliding the keyhole slots 18 along the shanks of the pins 22 until the beveled head drops into the round beveled recess of the slot 18. Referring to Fig. 1, it will be apparent that the sheet holding means 10 may be reversibly mounted on the backing support 11 by engaging either the lower keyhole slots 19 or the upper slots 18 with the grip pins 22, for a purpose to be later described.

The T-square shaped member 16 is adapted to be movably mounted upon the sheet holding member 10, and comprises a long metal strip 23, upon which the pins 17 are fastened, and a relatively short metal cross-strip or head portion 24. The cross-strip 24 may be fastened to the strip 23 at right angles thereto by welding the two together. A number of holes 25 are provided in the cross-strip 24 and are so located as to fit over the pins 15 of the sheet holding strip 10. It is apparent that the T-square shaped member 16 may be positioned upon the strip 14 at any predetermined place longitudinally thereof (see Figs. 1 and 2).

For the purpose of better illustrating the use of the distribution device, the making up of a payroll will be used as an example. The reference numeral 26 indicates generally a report sheet that has been divided up into a number of vertical sections 27 representative of different time periods. Each section 27 is severable from the next preceding section by means of a line of perforation or the like 28, and may be severed along this line to form an individual strip or record sheet containing all of the data pertaining to a distinct period. Each strip 27 is provided with marginal columns 29 and central columns 31.

After placing the report sheet 26 upon the backing support 11 and fastening the same in position by placing the sheet 26 upon the pins 15 through adequate openings 32 therein, the T-square shaped retaining member 16 is positioned upon the supporting member 11 on top of the sheet 26, as shown in Fig. 2. A number of vouchers or blank checks 33 are then placed in shingled relationship upon the retaining member 16 above the report sheet 26. The checks 33 are held in position by placing openings 34 provided in one marginal end portion thereof upon the pins 17. In the upper right hand corner of each check 33 are a number of blank spaces 35 that correspond to the columns 29 and 31 of the report sheet 26. Upon making an entry in the blank spaces 35 of a check 33 the same will be transferred directly to the report sheet 26 due to the back side of the check being treated for copying, or copying material may be interposed between the check 33 and the report sheet 26.

It will thus be apparent that, when an entry is made upon a check 33, a like entry will be simultaneously transferred to the report sheet 26. The top check 33 may then be removed, and corresponding entries may be made upon the next succeeding check. Thus it will be seen that the entry of the various items on the individual checks will result in their being simultaneously distributed on the desired section 27 of the record sheet 26.

After all entries have been made upon the sheet 26, the various sections 27 may be severed from each other and placed upon the supporting member 11 in a shingled relationship, as best illustrated in Fig. 3. The purpose of doing this is to facilitate the totaling and cross-adding of the various items entered thereon. After the strips 27 are placed in shingled relationship, a T-square 36 is placed upon the backing support 11, the T-square 36 having a groove on the underside that will rest upon the outer upturned edge of the channel member 13. This assures the operator of having a straight guide line to follow at all times in cross-adding the items on the strips 27. The operator may then read off the various accounts inscribed upon the record sheet 26 and total up the various amounts that are entered against any one individual. It is of course understood that the embodiment of the invention may be applied to other types of reports than the payroll system used herein as an illustration.

With the individual strips 27 positioned on the pins 15 as shown in Fig. 3, it may be found desirable to mount an auxiliary retaining member on the pins over the strips to positively hold them in place. The purpose of the two pairs of slots 18 and 19 in the strip retaining member 10 is to enable the latter and the strips 27 mounted thereon to be reversibly positioned on the backing support 11 as a unit to display the opposite or under sides of said strips, which may be inscribed similarly to the upper sides thereof.

Referring to Fig. 2, it will be readily apparent that the retaining member 16, together with the vouchers or checks 33 impaled thereon, may be mounted in any desired transverse position on the backing support 11 relative to the record sheet 26. It should also be noted that an auxiliary retaining member may be mounted on the member 16, if it is found desirable, for positively holding the several vouchers or checks 33 thereon.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. A distribution device, comprising a base member, a plurality of spaced elements mounted on said base member for retaining a distribution sheet in predetermined position on said base member, and means selectively positionable on certain of said elements and having means mounted thereon for retaining a plurality of vouchers in desired position relative to each other and to said distribution sheet.

2. A distribution device, comprising a base member, a plurality of spaced elements mounted on said base member for retaining a distribution sheet in predetermined position thereon, and means selectively positionable on said base member and maintained in selected position by certain of said elements and having means mounted thereon for retaining a plurality of vouchers in desired position relative to each other and to said distribution sheet.

3. A distribution duplication device, comprising a base member, a plurality of spaced elements mounted on said base member for retaining a record sheet in predetermined position on said base member, means selectively positionable on said base member and maintained in selected position by certain of said elements and having means mounted thereon for retaining a plurality of vouchers having duplicate means associated therewith in desired position relative to each other and to said record sheet, whereby the entry of items on said vouchers will simultaneously distribute said items upon said record sheet.

4. A distribution device, comprising a base member, a plurality of spaced elements mounted on said base member for retaining a distribution sheet in predetermined position on said base member, and means selectively positionable on certain of said elements and having means mounted thereon for retaining a plurality of vouchers in predetermined position relative to each other and to said distribution sheet, said distribution sheet being severable into a plurality of sections, and said spaced elements being adapted to retain said sections in shingled relationship on said base member.

5. A distribution device, comprising a backing support, a record sheet retaining member having a plurality of spaced elements associated therewith, means for mounting said member on said backing support, a T-shaped retaining member adapted to be selectively positioned on certain of said elements, and means on said T-shaped member for maintaining a plurality of vouchers in predetermined position relative to each other and to said record sheet.

6. A distribution device, comprising a backing support, a retaining member removably associated with said backing support and having a plurality of pegs upstanding therefrom for maintaining a record sheet in desired position on said support, and a second retaining member having apertures therein for engagement with selected ones of said pegs and having a plurality of pins upstanding therefrom for maintaining a plurality of vouchers in predetermined position relative to each other and to said record sheet.

7. A distribution device, comprising a record sheet retaining member having a plurality of spaced elements mounted thereon for engaging a record sheet, and a second retaining member movable relative to and engageable with certain of said elements to be maintained thereby in selected position on said first retaining member and having means mounted thereon for maintaining a voucher in predetermined position relative to said record sheet.

8. A distribution device, comprising a backing support, means removably associated with said backing support and having a plurality of members upstanding therefrom for maintaining a record sheet in desired position on said support, and a retaining member having apertures therein for engagement with selected ones of said upstanding members and having a plurality of members upstanding therefrom for maintaining a plurality of vouchers in predetermined position relative to each other and to said record sheet.

9. A distribution device, comprising a base member, means mounted on said base member and having a plurality of members upstanding therefrom for maintaining a record sheet in desired position on said base member, and a retaining member having apertures therein for engagement with selected ones of said upstanding members and having a plurality of members upstanding therefrom for maintaining a plurality of vouchers in predetermined position relative to each other and to said record sheet.

ANTON J. SMITH.
GEORGE J. COUPE.